United States Patent Office 3,075,023
Patented Jan. 22, 1963

3,075,023
RESTORATION OF THE ACTIVITY OF
INORGANIC SORBENTS
Rodger C. Garrison, Riverside, and Dennis J. Ward, Downers Grove, Ill., assignors to Universal Oil Products Company, Des Plaines, Ill., a corporation of Delaware
No Drawing. Filed Sept. 14, 1959, Ser. No. 839,590
7 Claims. (Cl. 260—676)

This application relates to a process for regenerating the activity of molecular sieve sorbents of the inorganic, thermally stable type in order to restore the sorbent to an active condition for sorption of straight chain compounds. More specifically, this invention concerns a method for reactivating molecular sieve sorbents which have become deactivated by accumulation of contaminating substances within the porous structure of the sorbent by a process which comprises passing an inert gas at a relatively high temperature through the sorbent for a time sufficient to strip high molecular weight sorbed organic compounds from the porous structure of the sorbent, thereafter treating the sorbent recovered from the first step with water at substantially the same temperature as the first mentioned treatment, followed by heating the sorbent at a substantially higher temperature while passing an inert gas through the sorbent to thereby complete the reactivation.

Several sorption-type processes utilizing specific sorbents are known for the separation of compounds on the basis of their molecular structure and/or chemical composition utilizing an inorganic sorbent containing pores in which one or more components of the mixture belonging to particular class of materials is selectively sorbed and retained in the pores of the sorbent but in which one or more components belonging to another class of substances are rejected by the sorbent. The sorbents having such selective sorbency are generally of the inorganic type, such as certain specially activated carbons, prepared for example, by carbonization of acid sludges, specially activated alumina, and a class of zeolite-type sorbents comprising certain metal alumino-silicates, particularly the dehydrated zeolitic alkali metal and alkaline earth metal alumino-silicates, which upon dehydration contain pores of from 4 to about 5 Angstrom units in cross-sectional diameter and which have a high sorbent capacity for polar molecules and normal or straight chain compounds containing at least 3 carbon atoms but which reject branched chain and cyclic compounds because the cross-sectional diameters of the pores do not permit entry of compounds having larger molecular diameters than the straight chain compounds. The activated carbons and aluminas are also capable of selectively sorbing straight chain compounds, particularly hydrocarbons, while rejecting branched chain and cyclic compounds having molecular diameters greater than can be accommodated by the internal pores of the sorbent. In all of these processes, however, the sorbent gradually becomes deactivated during use while the feed stock is on stream in the separation process as a result of the sorption of polar compounds which contaminate the feed stock or the sorption of higher molecular weight compounds which are retained by the sorbent with greater tenacity than the selectively sorbed component of the feed stock. Thus, in the use of alkaline earth metal aluminosilicates, such as a calcium alumino-silicate, containing pores of from 4 to 5 Angstrom units in cross-sectional diameter for the separation of straight chain hydrocarbons from their branched chain isomers and cyclic analogs, after several days of continued use, the capacity of the sorbent tends to decline. Examination of the deactivated molecular sieves indicates that several types of compounds are responsible for the deactivation. One class of material which produces an effect essentially similar to a deactivation of the sorbent is the high molecular weight, straight chain contaminants of the feed stock for which the molecular sieve sorbent has a greater preferential sorptiveness than for the lower molecular weight homologs present in the feed stock. Another class of substances which tends to deactivate the sorbent with respect to hydrocarbon feed stocks is the class referred to as polar compounds (i.e., organic compounds containing a polar radical, such as hydroxyl, carbonyl, nitro, sulfhydryl, amino, etc.) which, because of their electrophilic nature, tend to be retained by the sorbent with greater tenacity than the straight chain hydrocarbon components of the feed stock. Thus, a molecular sieve sorbent, such as an activated carbon prepared from an acid sludge, a metal alumino-silicate, etc., when utilized for treating a hydrocarbon feed stock contaminated with a small amount of an alcohol, a ketone, an amine, an aldehyde, a carboxylic acid, or other polar compound will gradually, after each sorption-desorption cycle, evidence a decline in sorptive capacity as the pores of the sorbent become progressively filled with the polar contaminant, thereby blocking off the inlet of such pores with the polar compound and preventing the entry of the normal component of the feed stock into such deactivated pores. Presumably, the deactivation increases with time as a greater proportion of the pore openings become clogged with the polar contaminant and the latter is retained by the sorbent, despite the desorption stage of the cycle which does not dislodge the more tenaciously held deactivating compound. Similarly, in the separation of straight chain hydrocarbons from branched chain and cyclic hydrocarbons, the hydrocarbon feed stock mixture generally contains a small but significant amount of higher molecular weight straight chain hydrocarbon components which are also retained by the sorbent with greater tenacity than their lower molecular weight homologs. Because of their preferential retentiveness on the sorbent and the inability of the desorbent to dislodge completely such contaminants from the sorbent, these higher molecular weight straight chain contaminants of the feed stock gradually accumulate in the pores of the sorbent until the quantity of the more tenaciously held longer chain or higher molecular weight contaminant is sufficient to block a major proportion of the pores and the sorbent becomes progressively less capable of sorbing the desired straight chain hydrocarbons of the feed stock, evidencing the characteristics of deactivation.

Methods heretofore employed for reactivating molecular sieve sorbents which have become deactivated as a result of the sorption of higher molecular weight compounds or polar contaminants within the porous structure of the sieves have relied upon heating the deactivated sorbent to a temperature above about 400° C., generally up to about 500° C., in an attempt to remove the deactivating component by vaporization, oxidation, or decomposition of the deactivating substance. It has been consistently observed, however, that in such attempted means of reactivation, the high molecular weight contaminant present within the porous structure of the sorbent tends to crack and carbonize at such temperatures or, if the contaminant is a polar compound, the residue within the pores of the sorbent tends to resinify or undergo various condensation reactions which also tend to fill the pores of the absorbent with permanently deactivating material. In fact, such methods of reactivation result in the deposition of refractory materials within the pores of the sorbent, thereby tending to cause a net permanent deactivation which tends to progressively reduce the activity of the sorbent by gradually increasing accumulation of irremovable contaminants which clog the pores of the sorbent and occupy space normally required for sorption of the straight chain component of the feed stock. Thermal methods of reactivation also cause the sorbed deactivating substance to crack into branched chain and olefinic residues. Once inside of the pore of the sorbent, the branched chain molecules formed via cracking cannot escape because the size of the pore opening is only sufficient to permit the passage therethrough of straight chain molecules. Similarly, the olefin formed inside of the pore is held more strongly than the normal paraffin component of the feed stock (because of its greater relative polarity) and cannot be displaced therefrom by thermal reactivation. In addition, the olefin tends to undergo polymerization with other olefins, forming a molecule much too large to be vacated from inside of the pore. Ultimately through successive reactivation-sorption cycles the pores of the sorbent are more or less completely filled and the sorbent thus substantially permanently deactivated.

In accordance with the present method of reactivation, higher molecular weight hydrocarbons or other organic, selectively sorbed components of the feed stock mixture are stripped from the sorbent by passing through the sorbent at a relatively low temperature a low molecular weight straight chain hydrocarbon, such as normal butane, to thereby remove a major proportion of the deactivating contaminant. Thereafter, a wet stream of the low molecular weight straight chain hydrocarbon is passed through the sorbent at the same temperature as the preceding stripping operation for a time sufficient to completely rehydrate the sorbent to its maximum state of hydration, the water contained in the hydrocarbon stream displacing any organic material which may have been retained by the sorbent during the deactivation. Such displaced organic material is carried away in the flowing stream of low molecular weight hydrocarbon passing through the bed of the sorbent and is ultimately removed from the process flow. The sorbent, now in its rehydrated condition, is thereafter heated to a temperature of from 250° to 375° C. to remove the water of hydration and reactivate the sorbent to substantially its initial sorbent capacity. During such heating operation the flush stream of low molecular weight hydrocarbon may be continued through the bed of sorbent to thereby sweep the vaporized water of hydration from out of contact with the resulting dehydrated sorbent.

In one of its embodiments, this invention relates to an improvement in the process for separating mixtures of organic compounds comprising a preferentially sorbable component and a non-sorbable component, in which process the feed mixture is contacted with a molecular sieve sorbent capable of selectively retaining in the pores of the sorbent the straight chain organic compounds in said mixture having at least 3 carbon atoms per molecule and of rejecting branched chain and cyclic compounds, and regenerating the sorbent which has become deactivated by retention of an organic compound of greater sorptiveness than the preferentially sorbed component of said feed mixture, said improvement comprising contacting the deactivated sorbent with a hydrocarbon stream containing a normal paraffin having from about 3 to about 8 carbon atoms and with a quantity of water sufficient to hydrate said sorbent, and thereafter heating the resulting hydrated sorbent to a temperature of from 250° to about 375° C., in the presence of said, water-free, hydrocarbon flush stream.

Depending upon the particular deactivating substance present within the pores of the sorbent, the procedure herein provided for reactivating the sorbent varies from a single purging step to one embodying multiple purges at varying temperatures, the number of purges required, in general, being dependent upon the relative difficulty of removing the deactivating component from the pores of the sorbent. As a general characteristic, the purge stream is a normal paraffinic hydrocarbon containing up to about 8 carbon atoms per molecule which purges by virtue of its ability to replace the sorbed deactivating component in the pores of the sorbent. The ability of the purge stream to replace the deactivating component sorbed in the internal pores of the sorbent is dependent upon several factors, including, the relative sorbabilities of the purge stream component and the sorbed deactivating component, as well as the molar ratio of the purge stream normal paraffin to the sorbed deactivating component. The relative sorbability of individuals in the same class of organic compounds is directly proportional to the number of carbon atoms in the respective compounds. Thus, normal hexane will replace sorbed normal butane, even if no more than an equimolar ratio of hexane to butane exists in the sorption zone. On the other hand, normal butane will replace sorbed normal hexane from the sorbent if the quantity of normal butane supplied to the sorption zone containing the normal hexane-sorbent complex in place is sufficient to provide a molar ratio of n-butane to n-hexane greater than 1 to 1, and more preferably, from 1.5 to 1, up to ratios of 10 to 1. In general, when the molecular weight of the deactivating component is substantially greater than the molecular weight of the purge stream, the proportion of purge gas to deactivating substance on a molar ratio basis must be substantially greater than 1 to 1 in order to provide the necessary concentration drive to displace deactivating substance with purge gas. The preferred reactivation procedure in the present process utilizes a purge stream of lower molecular weight n-paraffin than the sorbed deactivating contaminant, continuing the passage of the purge stream through the deactivated sorbent until the quantity of purge stream to deactivating component exceeds a molar ratio of 1 to 1. Because of its low viscosity and high degree of effectiveness, normal butane alone, or admixed with isobutane, constitutes the preferred purge stream for use in the present process.

As heretofore described, the sorbent is hydrated to its theoretical maximum during the hydration stage of the present process by passing moist purge gas through the sorbent until the quantity of moisture thus charged into the sorbent equals at least the theoretical maximum required to effect substantially complete hydration of the sorbent. A convenient means of thus introducing the water of hydration comprises injecting steam into the purge stream as the latter is charged into and passes through the bed of sorbent, the quantity of moisture required for this purpose varying with the type of sorbent to be reactivated. Thus, the quantity of water to be charged into the sorbent is directly proportional to the number of mols of water required to saturate the sorbent to its highest state of hydration.

Following the hydration step of the reactivation procedure hereof in which the quantity of water is sufficient to effect more or less complete hydration of the sorbent, the purge stream passing through the sorbent is increased to a temperature within the range of from about 250° to about 375° C. which is sufficient to restore the sorbent to its dehydrated, active sorbent state, if such temperature of reactivation is maintained for a period of time of sufficient duration to result in removal of a major proportion of the water of hydration, generally for a period of from 1 to about 5 hours, depending upon the temperature at which such dehydration occurs. When dehydration of the sorbent has proceeded to the desired degree, the sorbent is cooled to the operating temperature of the sorption cycle of the process, preferably while the purge stream continues to flow through the sorbent, whereby the sorbent pores become filled with the short chain hydrocarbon utilized as purge gas. The latter is readily displaceable from the pores of the sorbent by the feed stock normal compound (sorbate) and may thus be readily removed from the sorbent and recovered, if necessary, for reuse in the reactivation cycle.

Although the entire reactivation may be conducted at substantially atmospheric pressure, it is generally preferred to effect the purging stages of the process at a pressure at least equal to the sorption pressure and more preferably at a pressure sufficient to maintain the purge stream in substantially liquid phase and to operate the dehydration stage of the process at a subatmospheric pressure which assists in the removal of the water of hydration at a more rapid rate and with consumate finality. During the final purging stage, the purge stream is charged at a pressure preferably equal to the on-stream pressure of the sorption phase of the process, thereby eliminating any readjustment of pressure when the stream charged into the process is changed to feed stock.

The present invention is further illustrated with respect to several of its embodiments in the following examples, which however, are not intended to limit the scope of the invention necessarily in accordance therewith.

EXAMPLE I

In the following runs two columns packed with fixed beds of calcium aluminosilicate molecular sieves (Linde Products Co. 5A sieves) were each utilized to process a mixture of normal and isoparaffins recovered from a gasoline-boiling range reformate fraction (produced in the Platforming process), having an end boiling point of 200° C., and containing normal, branched chain and cyclic paraffins as well as aromatics. Each molecular sieve column contained approximately 2.5 cubic feet of Type 5A sieves and each received the same feed stock and was used in the same manner insofar as the sorption-desorption cycles of the separation process are concerned. In each case, the column received the foregoing feed stock in liquid phase at a temperature of 93° C., and at 200 p.s.i.g. pressure. A continuous system of analysis was maintained on the effluent product streams. When normal paraffins began to appear in the non-sorbed product effluent from the column (iso-paraffinic and cyclic hydrocarbons), the flow of feed stock into the column was discontinued and the sorbed n-paraffins were desorbed from the "spent" sieves by passing liquid n-butane at 93° C., and at 200 p.s.i.g. into the column, collecting the desorbed effluent (a mixture of n-butane and feed stock n-paraffins) at the bottom outlet of each column. When analysis of the desorbent effluent indicated that it contained nothing but n-butane, the flow of desorbent was discontinued and feed stock was again charged in liquid phase into the column. The above sorption-desorption cycles were continued on a continuous basis until the total volume of feed stock charged into each column was 200 gallons. During the processing period it was noted that the total capacity of each column for feed stock n-paraffins gradually declined. After a total feed stock volume of 400 gallons had been processed, the capacity of the sieves was approximately 82% of their initial capacity. After processing 600 gallons of feed, the capacity of the sieves had declined to 73% of their initial capacity and to 51% after processing 1200 gallons of feed stock.

Residual hydrocarbon liquid was withdrawn from each bed and the sieves thereafter subjected to a reactivation treatment. Each column was flushed with n-butane at 100° C., for 8 hours to insure removal of feed stock normal paraffins from the sieve particles. One column was thereafter purged with nitrogen heated to a temperature of 400° C., for 2 hours, followed by passing oxygen through the sieve bed at 450° C., for 2 hours. The sieves regenerated in this manner were then cooled and their capacity for liquid n-paraffin measured. The sieves retained a slight coloration following the treatment with oxygen and when regenerated in this manner, recovered approximately 84% of their initial capacity (i.e., they sorbed 84% by volume of the n-hexane sorbed by freshly prepared 5A sieves).

An another method of regeneration in accordance with the procedure provided by the present invention, the deactivated sieves of the other separation column were flushed with n-butane at 100° C. for 2 hours. Thereafter, the n-butane was saturated with water vapor at 110° C., and the resulting "wet" n-butane passed through the sieves until enough water had been added to the sieves to equal their total sorbate volume. The n-butane effluent from the column, containing the desorbed material removed from the "spent" sieves was collected, the n-butane distilled overhead from the residue and the latter analyzed by mass spectrographic means. The material recovered boiled over a temperature range of from 305° to 492° F. and consisted of the following classes of hydrocarbons:

*Mass Spectographic Analysis*

| | Vol., percent |
|---|---|
| Paraffins | 3.1 |
| Naphthenes, monocyclic | 1.5 |
| Naphthenes, bicyclic | 0.2 |
| Naphthenes (tricyclic) or cyclo-olefins | 1.0 |
| Alkylbenzenes | 82.8 |
| Indanes and tetralins | 5.6 |
| Alkylnaphthalenes | 5.8 |
| Tricyclic aromatics | Trace |

Following the treatment of the sieves with wet n-butane, the sieves were heated for 4 hours at 240° F., while nitrogen was passed through the sieves. Thereafter, nitrogen at a temperature of 550° to 600° F. was passed through the sieves for 4 days, followed by cooling to 240° F. and treatment of the sieves first with vaporized n-butane, followed by liquid n-butane. The sieves reactivated as indicated above were restored substantially to their initial capacity.

We claim as our invention:

1. In the process for separating mixtures of hydrocarbons comprising a preferentially sorbable hydrocarbon and a non-sorbable hydrocarbon, in which process the hydrocarbon feed mixture is contacted with an inorganic molecular sieve sorbent capable of selectively retaining in the pores of the sorbent a straight chain hydrocarbon in said mixture having at least 3 carbon atoms per molecule and of rejecting branched chain and cyclic compounds, and regenerating the sorbent which has become deactivated by retention in the sorbent of an organic contaminant of greater sorptiveness than the preferentially sorbed hydrocarbon of said feed mixture, the improvement comprising passing through the deactivated sorbent an inert hydrocarbon purge gas stream containing a normal paraffin having from about 3 to about 8 carbon atoms per molecule for a sufficient time to remove the major portion, at least, of said organic contaminant, thereafter adding $H_2O$ to the hydrocarbon stream and continuing the passage of the resultant wet stream through the sorbent for a time and at a temperature sufficient to saturate said sorbent with $H_2O$ to its highest state of hydration, and thereafter heating the resulting hydrated sorbent to a temperature of from about 250° to about 375° C. for a sufficient time to remove the water of hydration.

2. The process of claim 1 further characterized in that said paraffin is n-butane.

3. The process of claim 1 further characterized in that said feed mixture comprises $C_5$ and $C_6$ normal paraffins.

4. The process of claim 1 further characterized in that the hydrocarbon stream is saturated with water to the extent of the solubility of water in said stream at the temperature of treatment.

5. The process of claim 1 further characterized in that said sorbent is a metallic alumino-silicate containing pores of from 4 to about 5 Angstrom units in cross-sectional diameter.

6. The process of claim 5 further characterized in that said silicate is calcium alumino-silicate.

7. The process of claim 1 further characterized in that the flow of the hydrocarbon stream through the sorbent is continued during the heating step.

References Cited in the file of this patent
UNITED STATES PATENTS

| | | |
|---|---|---|
| 2,818,137 | Richmond et al. | Dec. 31, 1957 |
| 2,834,720 | Savoca | May 13, 1958 |
| 2,881,862 | Fleck et al. | Apr. 14, 1959 |
| 2,920,125 | Stiles | Jan. 5, 1960 |
| 2,940,926 | Henke et al. | June 14, 1960 |